L. B. BISSELL.
VEHICLE SPRING.
APPLICATION FILED OCT. 4, 1916.
1,240,929.
Patented Sept. 25, 1917.
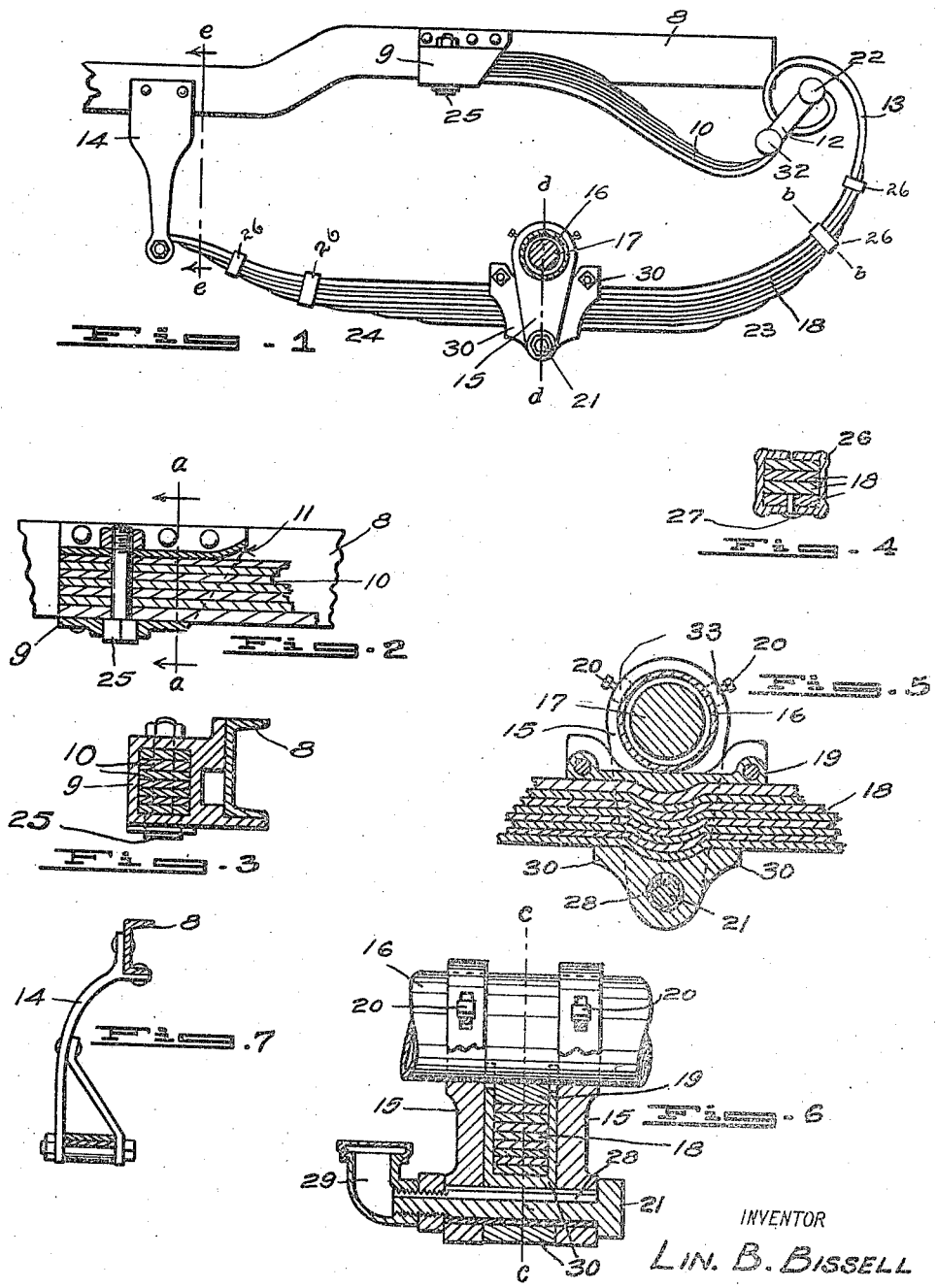

UNITED STATES PATENT OFFICE.

LINDON B. BISSELL, OF NORTH YAKIMA, WASHINGTON.

VEHICLE-SPRING.

1,240,929.  Specification of Letters Patent.  Patented Sept. 25, 1917.

Application filed October 4, 1916. Serial No. 123,610.

*To all whom it may concern:*

Be it known that I, LINDON B. BISSELL, a citizen of the United States, residing at North Yakima, in the county of Yakima and State of Washington, have invented a certain new and useful Improvement in Vehicle-Springs, of which the following is a specification.

My invention relates to improvements in vehicle springs. The difficulty with vehicle springs that have only the upward and downward movement to and from the axle is, that they must be constructed sufficiently stiff to support the load and when so constructed, they produce a rebound action after being suddenly compressed that causes a distinct jolt. The objects of my invention are: to provide a vehicle spring of such form of construction that it will have an action not only in an upward and downward but also in a parallel movement with respect to the body of the car so that it will neutralize or eliminate the rebound action of the spring when the spring has been suddenly compressed; to provide a rearward spring which will act in coöperation with the front spring and have such sensitiveness by reason of its construction that it will be readily depressed on curves to afford the necessary "banking" to give the effect of maintaining an equilibrium to the movements of the body of a vehicle; and to provide a spring in which the material is so distributed that it may be made of much less weight for a given load than is ordinary in springs heretofore known.

In the drawings hereto attached which illustrate my invention:

Figure 1 is a side view of the spring in elevation.

Fig. 2 is a view in vertical section of the fixed end portion of one of the spring members, showing the manner by which it is attached to a side rail of a chassis of a vehicle.

Fig. 3 is a sectional view on broken line of AA of said Fig. 2.

Fig. 4 is a cross-sectional view on broken line BB of Fig. 1.

Fig. 5 is a sectional view on broken line CC of Fig. 6.

Fig. 6 is a view in vertical section on broken line DD of Fig. 1, a fragmentary view of an axle being shown in side elevation.

Fig. 7 is a view in cross-section on broken line EE of Fig. 1.

Secured to the side rail 8 of the chassis of a vehicle is the specially designed clamping bracket 9 which holds firmly the end portion of a cantaliver spring 10. The upper part of this bracket 9 is bent upward as shown at 11, Fig. 2. The other end of the spring 10 is articulated to one end of a pair of connecting links 12, whose other end is articulated at the joint 22 to the coiled end portion of the top leaf of an elliptical spring 13. The joint 22 is provided with a grease cup as is also the joint 32. The other end of this latter spring is attached to the lower end of a bracket 14 secured to the side rail 8. The plates 15 together with the parts 30 constitute a specially designed clevis which suspends the spring from the axle housing 16 in which is the axle 17. The special clevis renders unnecessary a bolt through the leaves 18 under the axle bearing by being adapted to hold spring leaves of a concave form of construction as shown more clearly in Fig. 5, and thus weakening the spring by drilling for a bolt is avoided. Directly under the axle housing is the plate 19 which is flat on its upper surface and convex on its under side to fit the leaves 19. The axle clevis is keyed to the housing 16 by pins 20 secured in the said housing and operating in the slots 33 of the clevis. This provides for a free suspension of the spring on the axle. The plates 15 are held together under the leaves 18 by the bolt 21, which is provided with an oil groove 28 and a grease cup 29.

The operation of my spring is as follows: A sudden compression causes the leaves 10 to straighten and thus to actuate the pair of links 12 to a more nearly vertical position and thus transfer a downward strain to the coiled end portion of the spring 13. The force thus exerted on the joint 22 causes the coiled end of the spring 13 to bend forward with the effect of winding it, as it were, and thus gives the spring a movement lengthwise of the car. Upon a tendency of the chassis to rebound in an upward direction, the vertical position of the links 12, assumed upon the depression of the spring, exerts an upwardly directed force against the coiled end portion of the spring 13, which thus resists the upward movement of said links 12 with the result that the resuming by the spring of its normal position is gradual since the plates 12 will vibrate back and forth until the rebound effect is overcome. The line of action of the joint 22, when the vehicle is in motion, is between 30 and 60 degrees from the vertical through said joint. As the compression increases, the leaves 18 of the lower spring which is much stiffer than the cantaliver spring 10, reinforces the coiled end portion of spring 13. As that part of the spring 13 in the vicinity 23 is urged downward, it tends to move part 24 upward, bolt 21 acting as a fulcrum. At the same time the weight of the car bears bracket 14 downward. Thus, two forces in opposite direction are made to operate on part 24 of spring 13 which tend to straighten the leaves at said point. The straightening of these leaves tends to vary the distance between the joint 14 and the axle, permitting the axle to have a lengthwise movement with respect to the body of the car which operates in conjunction with the lengthwise movement produced by the coiled end portion of the spring 13. This lengthwise movement of the axle tends to let the axle move upwardly and backwardly in a direction, varying between 30 and 60 degrees from the vertical through the axle 17 and this, as readily seen, lessens the jar due to an obstruction in the path of the wheels. The leaves of the spring 10 are given free action as the curved part 11 of the hanger 9 avoids a sharp edge by which they would otherwise be restricted. This construction also lessens the danger of the leaves being broken at the point 11. The bolt head 25 is free to pass up through the hanger 9 so that the leaves of the spring 10 may be tightly secured against the upper part of the hanger. The leaf holder 26 is a strip of metal with heavy intermediate sections adapted to be bent around the leaves at sections 23 and 24, the heavy sections being arranged to come at the corners of the spring as shown in Fig. 4. A small rivet 27 which enters only the first leaf holds the fastener in place.

This construction makes possible a sensitive spring composed of the cantaliver spring 10 and the coiled end portion of the lower spring 13. The lower part of the spring 13 being constructed of heavier material is a stiffer spring than the cantiliver spring 10 and the coiled end portion of the lower spring 13. So sensitive is this upper spring in connection with the coiled end portion that the spring on the inner side of the vehicle depresses on curves to afford the necessary "banking" to give the effect of maintaining an equilibrium to the movements of the body of the vehicle.

While my invention achieves this sensitiveness, it also provides for a reinforcement of the lighter parts, i. e., the coiled end portion of spring 13, so that heavy loads may be carried. The lower spring 13 is much shorter than the old type of spring. The distribution of material in my invention, by providing for the lengthwise movement and a stiffer part to reinforce the coil only where the same is necessary, makes possible a spring of much less weight for a given load than is ordinary.

As applied to automobiles with the pivoted front spring, my rearward spring with its lengthwise movement eliminates another cause of jolting besides the rebound of the spring. When the front spring of an automobile is suddenly compressed its pivoted connection to the frame provides for a movement lengthwise with respect to the frame of the car and thus provides for a part of the inertia of the vehicle to be overcome and the further provision in my invention for a lengthwise movement in the rearward spring enables the latter to coöperate and act conjointly with the front spring in overcoming the inertia. In this way the jolt is avoided, which would otherwise ensue.

Obviously changes may be made in the forms, dimensions and arrangements of parts of my invention without departing from the principle or the spirit thereof. The links 12 may be dispensed with and the coiled end portion of spring 13 may be connected directly with the end of spring 10.

I claim:

1. A vehicle spring which embodies a cantaliver spring; a semi-elliptical spring with a coiled end portion; and an articulated link for connecting the said cantaliver spring and said coiled end portion of said semi-elliptical spring, said link being normally disposed at an angle from a vertical line, the end of said link that is attached to the end of said coiled end portion being above the other end of said link.

2. A vehicle spring which embodies a cantaliver spring, a semi-elliptical spring with a coiled end portion, and articulated link means for connecting the said cantaliver spring and said coiled end portion of said semi-elliptical spring, said means being normally disposed at an angle from a vertical line, the end of said articulated means, which secures the end of the coiled end portion, being above the other end of said means, and the ends of the said means being disposed to move in a direction to bring the line of the means in a vertical position in response to a depression of the spring.

3. A vehicle spring which embodies a cantaliver spring, a semi-elliptical spring with a coiled end portion, an articulated link means for connecting the said cantaliver spring and said coiled end portion of said semi-elliptical spring, said means being normally disposed at an angle from a vertical line, an axle housing, and a clevis freely mounted upon said axle housing disposed to be rotatively movable thereon.

4. A clevis adapted to be freely mounted upon an axle housing of a vehicle to be rotatively movable thereon, and embodying two separable portions fastened together by a bolt, a receptacle for spring leaves disposed between said two separable portions, and a clamping plate removably disposed to clamp said spring leaves within said receptacle.

In witness whereof I hereunto subscribe my name this 23rd day of September, A. D. 1916.

LIN B. BISSELL.

Witnesses:
JOHN H. LYNCH,
A. M. KOHLS.